United States Patent Office

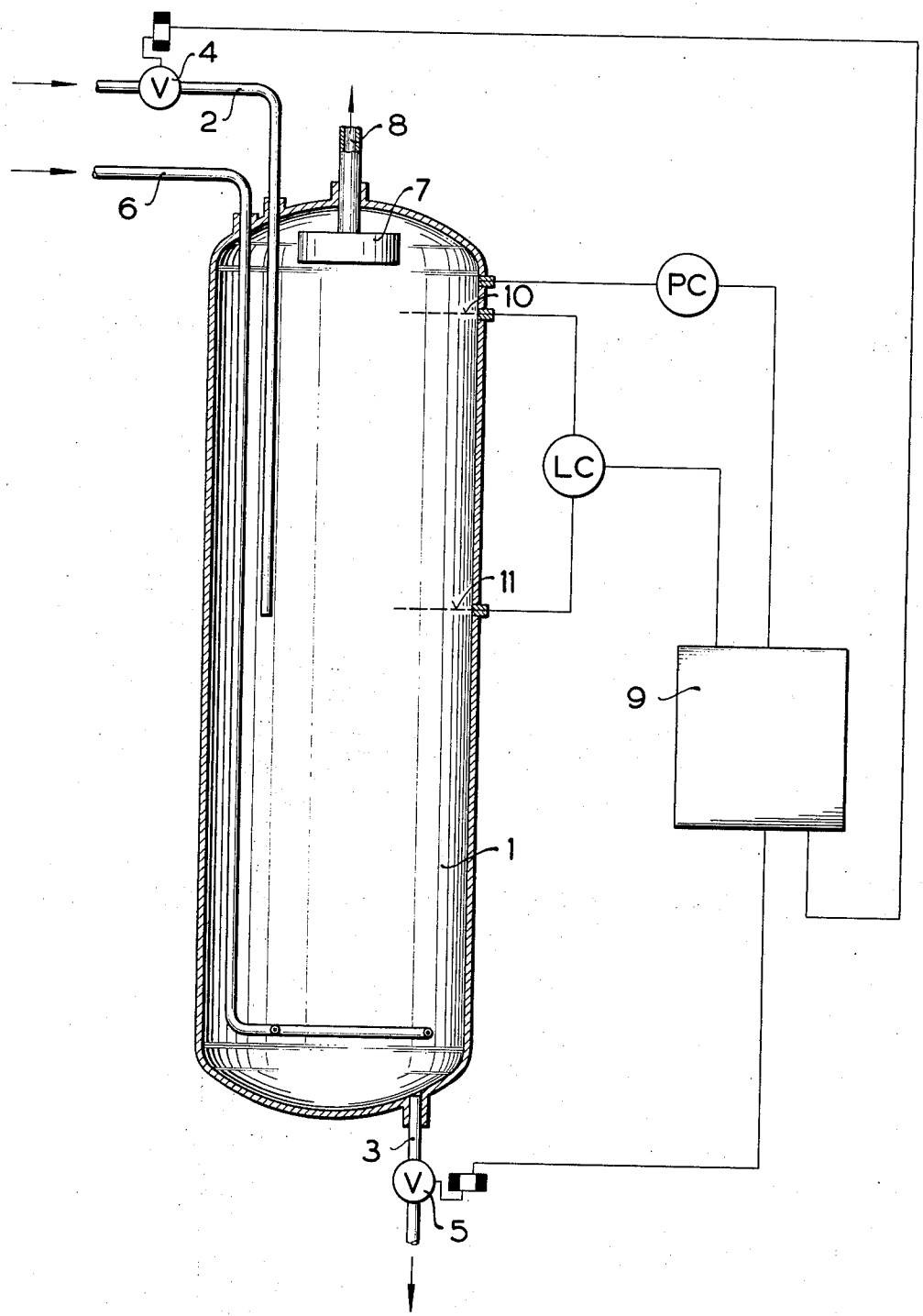

3,806,423
Patented Apr. 23, 1974

3,806,423
METHOD AND APPARATUS FOR CONTROLLING FOAM FORMATION IN AERATION REACTORS
Kurt Karrenbauer, Erftstadt Liblar, Gerhard Jaekel, Hurth-Hermulheim, Dieter Kirstein, Cologne, and Eitel Goedicke, Hurth-Efferen, Germany, assignors to Knapsack Aktiengesellschaft, Knapsack, near Cologne, Germany
Filed Dec. 3, 1971, Ser. No. 204,656
Claims priority, application Germany, Dec. 5, 1970, P 20 59 931.9
Int. Cl. C12b 1/14
U.S. Cl. 195—109
8 Claims

ABSTRACT OF THE DISCLOSURE

Method of and apparatus for controlling foam formation which may tend to vary at irregular intervals in a reaction necessitating the aeration of a liquid phase, and particularly in a biochemical fermentation reaction, in closed reactors. To this end, the foam pressure prevailing above the aerated liquid phase within the reactor is continuously regulated within a predetermined range. More particularly, the volume of the aerated liquid phase is modified by varying the quantities of liquid phase admitted to and/or discharged from the reactor.

---

The present invention relates to a method of, and to an apparatus for, controlling the formation of foam, which may be copious but which may also vary considerably and at irregular intervals, in aeration reactions, and particularly in biochemical fermentation reactions, which are carried out in closed reactors.

The formation of foam, which may be copious but which may also vary considerably and at irregular intervals, is a phenomenon which is often encountered in the aeration of liquids, particularly in those cases in which the aerated liquid undergoes a chemical reaction with the simultaneous evolution of a gaseous phase. Apart from the specific properties of the materials concerned and the specific reaction conditions employed, the degree of dispersion of the gas phase in the liquid is a particularly critical factor determining the intensity of foam formation. While very fine dispersion of the gas phase in the liquid would be highly desirable in the interest of obtaining a high turnover of material, per unit of volume, the fact remains that this does normally entail the formation of a finely-dispersed foam above the liquid.

Considerable formation of foam, producing widely varying pressure rises at irregular intervals, is inter alia encountered in biological fermentation reactions, for example in the continuous microbiological purification of effluents, in closed reactors, especially when a highly specific biological degradation requirement has to be met. An escape of foam which is particularly rich in microorganisms from the reactor, if it ever occurs, is very likely to result in an extensive breakdown of the biological degradation facility.

By the use merely of mechanical defoaming means of orthodox construction, or of chemical defoamers, it is impossible to control foam formation, and it should not be forgotten that the need to degrade the chemical defoamers, if used, will add to the degradation capacity which the microorganisms are required to possess.

It is an object of the present invention to provide a method and an apparatus permitting the formation of foam producing widely varying pressure rises at irregular intervals in aeration reactions, particularly in biological fermentation reactions, which are carried out in closed reactors, to be controlled so as to inhibit the escape of foam from the reactor.

According to the present invention, we provide a method of controlling foam formation which may tend to vary at irregular intervals in a reaction necessitating the aeration of a liquid phase, and particularly in a biochemical fermentation reaction, the reaction being carried out in a closed reactor, which method comprises continuously regulating within a predetermined range the foam pressure prevailing above the aerated liquid phase within the reactor by modifying the volume of the aerated liquid phase, the volume of the aerated liquid phase being modified by varying the quantities of liquid phase admitted to and/or discharged from the reactor.

The invention also includes an apparatus for carrying out the process of the present invention, which comprises an aeration reactor provided with a valved liquid phase inlet and a valved liquid phase outlet, the valves in said inlet and said outlet being automaticaly actuated; a gas inlet leading into the aeration reactor; a mechanical defoaming means disposed in the upper part of the aeration reactor and connected to a gas outlet; a pressure meter; and a level meter.

Further features which the apparatus of the present invention preferably possesses, and which may be used singly or in combination (except as stated), provide:

(a) for a pressure-responsive level meter to be used as the pressure meter, or
(b) for an industrial manometer to be used as the pressure meter, or
(c) for a differential pressure-responsive meter to be used as the pressure meter; and
(d) for a pressure-responsive level meter to be used as the level meter, or
(e) for a mechanical float level to be used as the level meter, or
(f) for a liquid level meter fitted with an immersion element to be used as the level meter; and
(g) for the use of a control system permitting pressure data obtained by means of the pressure meter to be compared with a desired value; permitting departures of the pressure test data from the desired value to be registered; and, in the event that the pressure test data are found to deviate from the desired value, permitting adjustment signals to be passed to the automatic valves whereby in cooperation with the level meter they maintain the liquid level in the aeration reactor between a given maximum and a given minimum.

As results from the statements made hereinabove, a pressure-responsive level meter or an industrial manometer or a differential pressure-responsive meter can be used as the pressure meter (PC) which is connected to the upper part of the reactor within the region of the foam phase and continuously measures the foam pressure in the upper region of the reactor.

Furthermore a pressure-responsive level meter or a mechanical float level or a liquid level meter fitted with an immersion element can be used as the level meter (LC), which is connected to the reactor at two points defining the upper and lower level limits for the liquid phase, and which permits the level of the aerated liquid phase to vary between the said two limits.

Finally the control system is connected to two automatically actuated valves, one of them being positioned in the liquid phase inlet and the other in the liquid phase outlet, to the said level meter (LC) and to the said pressure meter (PC). In the event that the pressure of the foam phase deviates from a predetermined value, the control system gives adjustment signals to the automatically actuated valves which are opened or closed and thereby cause the level of the aerated liquid phase in the reactor to be lowered or raised, in which the level meter (LC) is operatively coupled with the control system so as to permit the level of the liquid phase to vary between the said two limiting points in the reactor. In the apparatus of the present invention, use is made of a control system that is known to those skilled in the art.

In order to enable effective use to be made of mechanical defoamers of orthodox construction in closed reactors, it is necessary in accordance with this invention to compensate for changes in the pressure of the foam phase by varying the volume available to the foam. This can be done by appropriately varying the quantities of liquid phase admitted to and/or discharged from the reactor, whereby the level of the liquid phase in the aeration reactor is raised or lowered. Even minor changes of the volume occupied by the liquid phase will satisfactorily control the pressure of the foam.

To prevent the reactor from emptying completely, and to avoid the overflow of material therefrom, it is advisable for the quantities of liquid phase admitted to and discharged from the aeration reactor to be varied within certain limits only, i.e. within such limits that the maintenance of the level of the liquid in the reactor between a given maximum and a given minimum is ensured. Only by this step is it possible, for example in biochemical fermentation reactions, to operate with the desired efficiency over very long periods of time. The reasons for this are twofold. Firstly, it is necessary to have a certain minimum space available for the foam, above the liquid phase. Secondly, however, it is necessary for the aeration reactor to contain a certain minimum quantity of liquid phase. Failing this, there is a drop in the rate of reaction, since following the restoration of a higher liquid level in the aeration reactor, the liquid phase will initially have a deficiency of microorganisms.

Use has been made of the present process, for example, in biochemical fermentation reactions in closed reactors, wherein the rate of reaction was found to have been increased by substantially 40 percent, in continuous operation.

In the accompanying drawing, the single figure is a diagrammatic side elevational view of a typical form of apparatus for carrying out the process of the present invention, which is not, however, limited to the embodiment shown, but admits of various modifications without departing from its scope as defined in the claims set forth below.

As can be seen from the figure, an aeration reactor 1 is provided with a liquid phase inlet 2 and a liquid phase outlet 3. The inlet 2 and outlet 3 are provided with automatic valves 4 and 5 respectively. A gas admission tube 6 projects into the aeration reactor from above. Placed in the upper part of the aeration reactor 1 is a mechanical defoamer 7 of orthodox construction, having a gas outlet 8 connected thereto.

Also in the upper part of the aeration reactor 1, namely above the highest level which is to be reached by the liquid phase, there is a pressure meter (PC). The apparatus is further provided with a level meter (LC) which continually monitors the level of the liquid phase in the upper half of the aeration reactor 1, this level varying between a highest level 10 and a lowest level 11.

A control system 9 is arranged to respond to signals from the pressure meter (PC) and level meter (LC) and, after reception of such signals, to pass adjustment signals to automatic valves 4 and 5.

We claim:

1. A method for inhibiting the escape of foam from closed reactors, having mechanical defoaming means therein, in biochemical fermentation reactions necessitating the aeration of a liquid phase, the fermentation reactions involving intensive foam formation varying at irregular intervals, which method comprises continuously measuring the foam pressure prevailing above the aerated liquid phase within the reactor; and, in the event that the foam pressure is found to deviate from a predetermined value, regulating the level of the aerated liquid phase between two liquid level limits by varying the quantities of liquid phase admitted to, and/or discharged from, the reactor.

2. An apparatus for carrying out the method as claimed in claim 1, the apparatus comprising a reactor (1); a liquid phase inlet (2) penetrating through the cover of the reactor (1) and a liquid phase outlet (3) penetrating through the bottom of the reactor (1), the said inlet (2) and said outlet (3) having automatically actuated valves (4, 5) positioned therein; a gas admission tube (6) penetrating through the cover and terminating near the bottom of the reactor (1); a mechanical defoamer (7) disposed in the upper part of the reactor (1) and connected to a gas outlet (8), penetrating through the cover of the reactor (1); a pressure meter (PC) connected to the upper part of the reactor (1) within the region of the gas phase; a level meter (LC) connected to the reactor (1) at two points (10, 11) and controlling the level of the liquid phase within a region lying within the said two points (10, 11); and a control system (9) connected to the automatically actuated valves (4, 5), the pressure meter (PC) and the level meter (LC); the said control system (9) permitting pressure data indicated by the pressure meter (PC) to be compared with a predetermined value; and in the event that the pressure test data are found to deviate from the predetermined value, permitting adjustment signals to be passed to the automatically actuated valves (4, 5), wherein, in the event that the pressure data indicated by the pressure meter (PC) are higher than the predetermined value, the valve (4) in the liquid phase inlet (2) is closed and the valve (5) in the liquid phase outlet is opened with the result that the level of the liquid phase in the reactor (1) is lowered, and vice versa.

3. The apparatus as claimed in claim 2, wherein the pressure meter is a pressure-responsive level meter.

4. The apparatus as claimed in claim 2, wherein the pressure meter is an industrial manometer.

5. The apparatus as claimed in claim 2, wherein the pressure meter is a differential pressure-responsive meter.

6. The apparatus as claimed in claim 2, wherein the level meter is a pressure-responsive level meter.

7. The apparatus as claimed in claim 2, wherein the level meter is a mechanical float level.

8. The apparatus as claimed in claim 2, wherein the level meter is a liquid level meter fitted with an immersion element.

References Cited
UNITED STATES PATENTS 3,154,577  10/1964  Carter et al. _____ 252—361

OTHER REFERENCES

Aiba et al.: Biochemical Engineering, Academic Press (1965), pp. 260–261.

A. LOUIS MONACELL, Primary Examiner

R. B. PENLAND, Assistant Examiner

U.S. Cl. X.R.

195—142, 107